(12) United States Patent
Hesselmans et al.

(10) Patent No.: US 7,439,316 B2
(45) Date of Patent: Oct. 21, 2008

(54) PROCESS FOR PREPARATION OF STABLE POLYCARBODIIMIDE DISPERSIONS IN WATER, WHICH ARE FREE OF ORGANIC SOLVENTS AND MAY BE USED AS CROSSLINKING AGENT

(75) Inventors: Laurentius Cornelius Josephus Hesselmans, 's-Hertogenbosch (NL); Andries Johannes Derksen, Nijmegen (NL); Jacob Christiaan Munneke, Kaatsheuvel (NL)

(73) Assignee: Stahl International B.V., Waalwijk (NL)

( * ) Notice: Subject to any disclaimer, the term of this patent is extended or adjusted under 35 U.S.C. 154(b) by 191 days.

(21) Appl. No.: 11/320,189

(22) Filed: Dec. 28, 2005

(65) Prior Publication Data

US 2006/0106189 A1    May 18, 2006

(51) Int. Cl.
*C08G 18/70* (2006.01)
*C08G 18/08* (2006.01)
(52) U.S. Cl. ......................................... 528/71; 524/589
(58) Field of Classification Search .................. 528/71; 524/589
See application file for complete search history.

(56) References Cited

U.S. PATENT DOCUMENTS

| | | | |
|---|---|---|---|
| 4,735,990 A * | 4/1988 | Kihara et al. | 524/805 |
| 5,210,260 A * | 5/1993 | Bohshar et al. | 558/90 |
| 5,688,875 A | 11/1997 | Sasaki et al. | |
| 5,856,014 A | 1/1999 | Imashiro et al. | |
| 5,859,166 A | 1/1999 | Sasaki et al. | |
| 5,958,516 A | 9/1999 | Imashiro et al. | |
| 5,998,543 A * | 12/1999 | Collins et al. | 524/808 |
| 6,005,035 A * | 12/1999 | Raynolds et al. | 524/253 |
| 6,127,029 A | 10/2000 | Imashiro et al. | |
| 6,127,477 A | 10/2000 | Imashiro et al. | |
| 6,184,410 B1 | 2/2001 | Bollmann et al. | |
| 6,248,819 B1 | 6/2001 | Masuda et al. | |
| 6,498,225 B2 * | 12/2002 | Tebbe et al. | 528/170 |
| 2001/0037010 A1 * | 11/2001 | Tebbe et al. | 528/170 |

FOREIGN PATENT DOCUMENTS

| EP | 0 628 582 A2 | 12/1994 |
|---|---|---|
| EP | 0 686 626 A1 | 12/1995 |

OTHER PUBLICATIONS

Synthesis, characterization, and stability of carbodiimide gorups in carbodiimide-functionalized latex dispersions and films. Pham, Hung H., et al. Journal of Polymer Science, Part A: Polymer Chemistry (2000), Wol. 38(5), pp. 855-869. Full document.*

* cited by examiner

*Primary Examiner*—Mark Eashoo
*Assistant Examiner*—Noah Frank
(74) *Attorney, Agent, or Firm*—Jeffrey D. Myers; Peacock Myers, P.C.

(57) ABSTRACT

A process for the preparation of stable aqueous polycarbodiimide dispersions, to be used as crosslinking agent, which are free of organic solvents is described. Sid process is characterized in: reacting a polyisocyanate in the presence of a carbodiimide catalyst to form a polycarbodiimide, terminating and/or chain extending the polycarbodiimide chain by the addition of formation dispersion of the resulting compound in water, wherein pH is adjusted to a value between 9 and 14 by the addition of a base and/or a buffer to the water used for the dispersion and/or to the obtained aqueous dispersion. According to the present process said terminating or chain extending with the compound containing a hydrophylic group and one or more amine functions may also occur during or after the dispersion of the polycarboiimide in water. The preferred pH of the polycarbodiimide dispersions is between 11 and 13. Furthermore the invention related to a coating mixture comprising the polycarbodiimide dispersions obtained by the invention as crosslinking agent and an aqueous resin containing carboxylic acid functions. Finally the invention comprises cured material obtained by applying said coating mixture to a substrate, and evaporating the water.

13 Claims, No Drawings

PROCESS FOR PREPARATION OF STABLE POLYCARBODIIMIDE DISPERSIONS IN WATER, WHICH ARE FREE OF ORGANIC SOLVENTS AND MAY BE USED AS CROSSLINKING AGENT

Polycarbodiimides are well known crosslinking agents for aqueous resins containing carboxylic acid functions. Most commercially available polycarbodiimide crosslinkers are dissolved in an organic solvent, which is disadvantageous for environmental reasons. Further, they have to be mixed with either water, or water and a surfactant, before they can be mixed with the aqueous resin. Generally, these aqueous dispersions are not stable and have to be freshly prepared daily. Only aqueous tetramethylxylene diisocyanate based polycarbodiimides are stable in water as described in U.S. Pat. No. 5,688,875 (=EP 0686626) and U.S. Pat. No. 5,859,166. However, a disadvantage of these polycarbodiimides is that the conditions for the carbodiimide formation from tetramethylxylene diisocyanate are rather extreme: 22 hrs at 180° C. are required and 2% of a carbodiimide catalyst. Further tetramethylxylene diisocyanate based polycarbodiimides are slower and less efficient crosslinkers than isophorone diisocyanate or 4, 4'-dicyclohexylmethane diisocyanate based crosslinkers.

Aqueous polycarbodiimide dispersions obtained from isophorone diisocyanate and from 4, 4'-dicyclohexylmethane diisocyanate as described in U.S. Pat. Nos. 5,856,014, 5,958,516, 6,127,029, 6,127,477, are not stable. The carbodiimide amounts from commercial aqueous polycarbodiimide products (Carbodilites from Nisshinbo Industries) decrease in a stability test at 50° within 6 weeks to 15-70% of the original value.

The object of the present invention is to provide a process in which the disadvantages mentioned above are eliminated.

DESCRIPTION OF THE INVENTION

According to the present invention there is provided a process for the preparation of stable aqueous polycarbodiimide dispersions, to be used as crosslinking agent, which are free of organic solvents, characterised in:
   reacting a polyisocyanate in the presence of a carbodiimide catalyst to form a polycarbodiimide,
   terminating and/or chain extending the polycarbodiimide chain by the addition of a compound containing a hydrophilic group and one or more amine and/or hydroxy functions during or after the polycarbodiimide formation,
   dispersion of the resulting compound in water,
wherein the pH is adjusted between 9 and 14 by the addition of a base or a buffer to the water used for the dispersion and/or to the obtained aqueous dispersion. Alternatively stable aqueous polyisocyanate based polycarbodiimide dispersions can be obtained when the capping or chain extension with the compound containing a hydrophilic group and one or more amine functions is not effected during or after the polycarbodiimide formation, but occurs during or after the dispersion of the polycarbodiimide in water.

Surprisingly the stability of the polycarbodiimide dispersions was significantly increased at higher pH values and the carbodiimide concentration was not decreased within 8 weeks at 50° C. Preferably at the end of the process the pH will be adjusted to a value between 11 and 13.

Conventional carbodiimide catalysts as described in EP 878496 may be used. Surprisingly, it appeared that the reaction temperature and the reaction time could be reduced when 1-methylphospholene-1-oxide was used as catalyst and for this reason this catalyst is preferred.

The polyisocyanate which is used to prepare the polycarbodiimide as a conventional polyisocyanate and may be toluene-2,4-diisocyanate, toluene-2,6-diisocyanate and mixtures thereof, diphenylmethane-4,4-diisocyanate, 1,4 -phenylene-diisocyanate, dicyclohexylmethane-4,4'-diisocyanate, 3-isocyanatomethyl-3,5,5-trimethylcyclohexylisocyanate, 1,6-hexyldiisocyanate, 1,4-cyclohexyl-diisocyanate, norbonyldiisocyanate diisocyanate, or a mixture thereof and is preferably dicyclohexylmethane-4,4'-diisocyanate.

The base which is used to adjust the pH may be an alkali hydroxide such as lithium hydroxyde, sodium hydroxyde, potassium hydroxide, or a trialkylamine or a trialkylamine containing hydroxyl functions. Optionally, the base or part of the base may be incorporated in the polycarbodiimide chain by capping the polycarbodiimide chain with a dialkylaminoalkyl-amine or alcohol, and/or by the addition of 0.01-0.3 equivalents regarding to the diisocyanate of a tertiary amine containing polyol or polyamine during or after the polycarbodiimide formation.

A buffer may be used to fix the pH value. Useful buffers are those with an effective pH range between 9 and 14.

The compound containing a hydrophilic group and one or more amine and/or hydroxyl functions is a polyethoxy mono- or diol, a polyethoxy/polypropoxy mono- or diol, a polyethoxy mono- or diamine, a polyethoxy/polypropoxy mono- or diamine, a diol or diamine with a polyalkoxy side chain, an hydroxy- or amine alkylsulfonate, or a dialkylaminoalkyl -alcohol or amine.

The polycarbodiimide dispersions of the invention may be used as a crosslinker for carboxylic group containing resins in a conventional way: a coating mixture comprising the polycarbodiimide dispersion of the invention and an aqueous resin containing carboxylic acid functions, is prepared. The material is cured by applying the coating mixture to a substrate, for example leather or artificial leather, and evaporating the water. Many additional ingredients may be present, for example fillers, colorants, pigments, silicons, surfactants and the like.

For several applications it is advantageous when the distance between the carbodiimide functions in the molecule is increased. In this way the crosslinking is less rigid, the coatings will be more flexible and problems such as greying, which is an effect that the coating is turning greyish and mat at stretching, or brittleness of the coatings may be prevented. Therefore flexible segments may be incorporated in the polycarbodiimide chain as a "spacer" to separate the carbodiimide functions. For this interest 0.01-0.30 equivalents of a mono- or polyol or a mono- or polyamine regarding to the polyisocyanate are added before, during or after the polycarbodiimide formation, which polyol or polyamine is for example a mono or polyhydroxy-alkane, a polyether mono-or polyol, a polyester polyol, a polycarbonate polyol, a polycaprolactam polyol, a mono- or polyamino-alkane, a polyether mono-or polyamine.

The polycarbodiimide dispersions of the invention have several advantages:—the dispersions are stable—the polycarbodiimide is an aqueous dispersion and can be easily mixed with an aqueous resin containing carboxylic acid functions—the products are solvent free and no volatile organic vapours escape during the application—the carbodiimide formation with 4,4'-dicyclohexylmethylene diisocyanate (and isophorone diisocyanate) with 1-methylphospholene-1-oxide as carbodiimide catalyst takes less extreme conditions than the procedure with the diisocyanates described in U.S. Pat. Nos. 5,688,875 and 5,859,166.

EXAMPLES

Examples 1A-1F

The preparation of aqueous dispersions of polycarbodiimides based on dicyclohexylmethane-4,4'-diisocyanate.

Under a nitrogen atmosphere 262 g of dicyclohexylmethane-4,4'-diisocyanate (in the following indicated as HMDI) and 4 g of 1-methylpholene-1-oxide were heated while stirring to 140° C. and heating was continued until an isocyanate content of 8.20 was obtained. Then the mixture was cooled to 90-100° C. The reaction time was 8 hrs. Hydrophilic compounds were added as indicated in Table 1. 0.01 weight % of dibutyl tin laureate was added as a catalyst when hydroxy functional hydrophilic compounds were used and the mixtures were reacted further at 90-100° C. until the NCO-signal in the IR-spectrum was disappeared. In the case of Example 1E the amine functional compound was added after 1 hr of reaction time. The mixtures were cooled down to 60-65° C. and dispersed in water of 60-65° C. while the solids amount was adjusted to 35%. In the case of Example 1F the amine functional compound was added to the dispersion afterwards and the mixture was stirred for 10 min. A 10% solution of a base in water as presented in Table 1 was added until the pH was 11-12. The samples were subjected to a stability test at 50° C. Every 2 weeks the carbodiimide amount was checked. The products were stable for at least 8 weeks at 50° C.

TABLE 1

| no | hydrophilic hydroxy functional compounds I and II | weight amounts of compounds I and II (g) | base used to adjust the pH |
|---|---|---|---|
| 1A | M-PEG-350[a] | 158.67 | sodium hydroxide |
| 1B | M-PEG-350 | 158.67 | triethanolamine |
| 1C | M-PEG-350 | 158.67 | ammonia |
| 1D | M-PEG-350 + DMEA[b] | 79.33 + 20.17 | sodium hydroxide |
| 1E | M-PEG-350 + methoxyethylamine | 119.00 + 8.50 | sodium hydroxide |
| 1F | M-PEG-350 + Na-taurine[c] | 79.33 + 33.32 | sodium hydroxide |

[a]M-PEG-350 is a polyethoxy ethanol with a mean molecular weight of 350
[b]DMEA is N-dimethylethanolamine
[c]Na-taurine is sodium 2-aminoethylsulfonate

Examples 2A-2G

The preparation of aqueous dispersions of polycarbodiimides based on HMDI.

The examples of example 1A-1F were repeated with the exception that the water was replaced by a 0.01 M disodiumphosphate buffer solution. The samples were subjected to a stability test at 50° C. Every 2 weeks the carbodiimide amount was checked. The products were stable for at least 8 weeks at 50° C.

Example 3

The preparation of an aqueous dispersion of a polycarbodiimide based on HMDI.

The example of 1A was repeated with the exception that 15 g of butanediol was added to the diisocyanate before the catalyst for the carbodiimide formation was added. The reaction was continued until an isocyanate content of 7.01 was obtained and the amount of M-PEG was 148.61 g.

Example 4

The preparation of an aqueous dispersion of a polycarbodiimide based on HMDI.

Under a nitrogen atmosphere 262 g of HMDI and 4 g of 1-methylpholene-1-oxide were heated while stirring to 140° C. and heating was continued until an isocyanate content of 14.26 was obtained and the mixture was cooled to 90° C. Polyols were added as presented in Table II plus 0.01 weight % of dibutyl tin laureate. Stirring was continued for 30 min at 90° C. and 147 g of M-PEG-350 was added. Stirring was continued at 90° C. till no NCO-signal was observed in the IR-spectrum. The mixtures were cooled down to 60-65° C. and dispersed in water of 60-65° C. while the solids amount was adjusted to 40%. A 10% solution of NaOH in water was added until the pH was 11. The sample was subjected to the stability test as mentioned above. The products were stable for at least 8 weeks at 50° C.

TABLE II

| no | polyol | weight amount of the spacer (g) |
|---|---|---|
| 4A | ethyleneglycol | 12.4 |
| 4B | 1,6-hexanediol | 23.6 |
| 4C | triethyleneglycol | 30.0 |
| 4D | PPG-425[a] | 85.0 |

[a]PPG-425 is a propyleneglycol with a mean molecular weight of 425

Example 5

The preparation of aqueous dispersions of polycarbodiimides based on diphenylmethane-4, 4'-diisocyanate.

Under a nitrogen atmosphere 150 g of diphenylmethane-4, 4'-diisocyanate and 140 g M-PEG-350 were heated to 80° C. and the mixture was stirred for 60 min at 80° C. 0, 4 g of 1-methylpholene-1-oxide was added and heated and stirring at 80° C. was continued until the NCO-signal in the IR-spectrum was disappeared. The reaction time was 3 hrs. The mixtures were cooled down to 60-65° C. and dispersed in water of 60-65° C. while the solids amount was adjusted to 40%. 5% Of a 1 molar solution of sodium carbonate in water was added and the obtained mixture was stirred until homogenous and then a 10% solution of sodium hydroxyde in water was added until the pH was 11-12.

What is claimed is:

1. A process for the preparation of stable aqueous polycarbodiimide dispersions, to be used as crosslinking agent, which are free of organic solvents, the process comprising the steps of:

reacting a polyisocyanate in the presence of a carbodiimide catalyst to form a stable polycarbodiimide;

terminating and/or chain extending the polycarbodiimide chain by the addition of a compound containing a hydrophilic group and one or more amine and/or hydroxyl functions during or after the polycarbodiimide formation; and dispersing the resulting compound in water, wherein the pH is adjusted to a value between 9 and 14 by the addition of a base and/or a buffer to the water used for the dispersion and/or to the obtained aqueous dispersion; and wherein said terminating or chain extending with the compound containing a hydrophilic group and one or more amine functions occurs during or after the dispersion of the polycarbodiimide in water.

2. A process according to claim 1, wherein the pH of the polycarbodiimide dispersions is adjusted to a value between 11 and 13.

3. A process according to claim 1, wherein said carbodiimide-forming catalyst is 1-methylphospholene-1-oxide.

4. A process according to claim 1, in which the polyisocyanate which is used to prepare the polycarbodiimide is toluene-2,4diisocyanate, toluene-2-,6-diisocyanate and mixtures thereof, diphenylmehtane-4,4'diisocyanate, 1,4-phenylenediisocyanate, diyclohexylmethane-4,4'diisocyanate, 3-isocyanatomethyl-3,5,5-trimethylcyclohexylisocyanate, 1,6-hexyldiisocyanate,1,4-cyclohexyl-diisocyanate, norbonyldiisocyanate, or a mixture thereof.

5. A process according to claim 4, wherein the polyisocyanate is dicyclohexylmehtane-4,4'-diisocyanate.

6. A process according to claim 1 wherein said base is an alkali hydroxide.

7. A process according to claim 6 wherein said base is lithium hydroxide, sodium hydroxide, potassium hydroxide, or a trialkylamine, or a trialkylamine containing hydroxyl functions.

8. A process according to claim 1 said base or part of said base is incorporated in the polycarbodiimide chain by capping the polycarbodiimide chain with a dialkylaminoalkylamine or alcohol, and/or by the addition of 0.01-0.3 equivalents regarding to the diisocynate of a tertiary amine containing polyol or polyamine during or after the polycarbodiimide formation.

9. A process according to claim 1, wherein the effective pH range of the buffer is between 9 and 14.

10. A process according to claim 1, wherein said compound containing a hydrophilic group and one or more pound containing a hydrophilic group and one or more amine and/or hydroxyl functions is a polyethoxy mono- or diol, a polyethoxy/polypropoxy mono- or diol, a polyethoxy mono- or diamine, a polyethoxy/polypropoxy mono- or diamine, a dial or diamine with a polyalkoxy side chain, an hydroxyl- or amine alkylsulfonate, or a dialkylaminoalkylalcohol or amine, or a mixture thereof.

11. A process according to claim 1, wherein 0.01-0.30 equivalents of a mono- or polyol or a mono- or polyamine regarding to the polyisocyanate are added before, during or after the polycarbodiimide formation, which polyol or polyamine is for examine a mono- or polyhydroxy-alkane, a polyether mono- or polyol, a polyester polyol, a polycarbonate polyol, a polycaprolactam polyol, a mono- or polyaminoalkane, a polyether mono- or polyamine.

12. A coating mixture comprising the polycarbodimide dispersions obtained according to claim 1 as crosslinking agent and an aqueous resin containing carboxylic acid functions.

13. Cured material obtained by applying the coating mixture of claim 12 to a substrate, and evaporating the water.

\* \* \* \* \*